Figure 6:
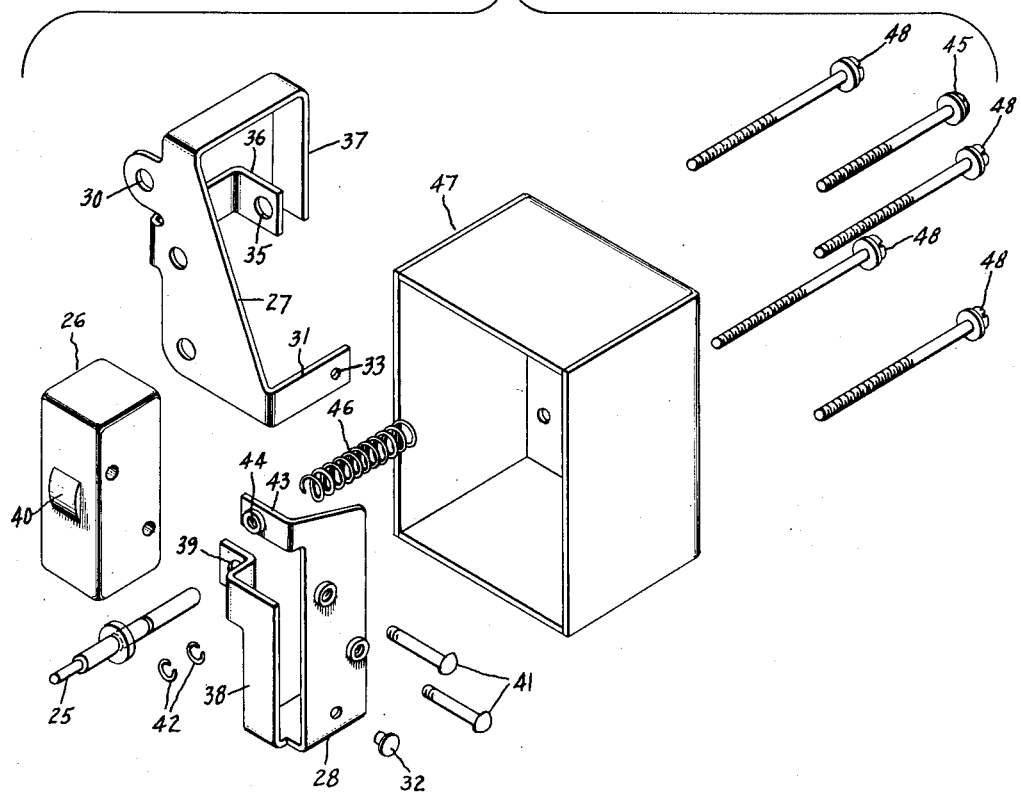

June 20, 1950 R. P. LOVELAND 2,512,349
POWER TRANSMISSION DEVICE
Filed Dec. 27, 1946 2 Sheets-Sheet 1
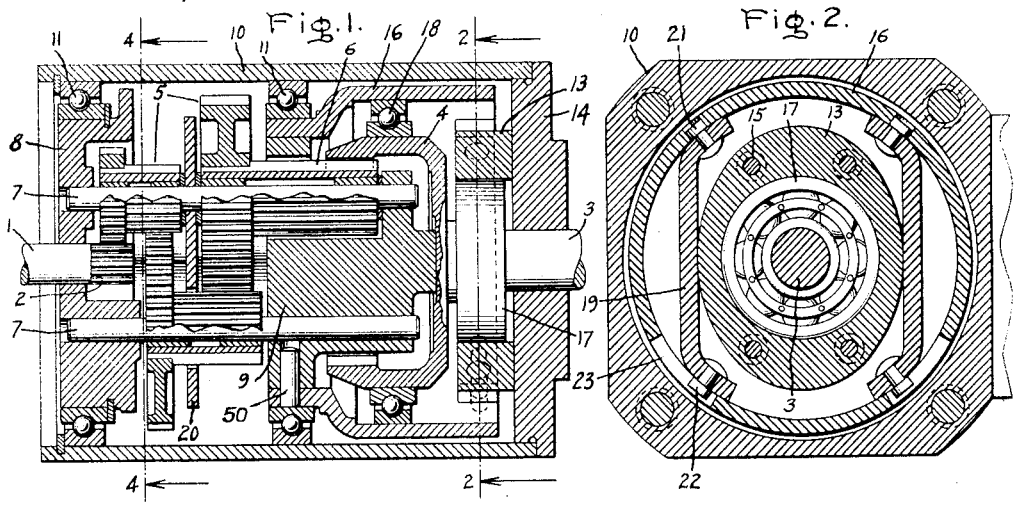
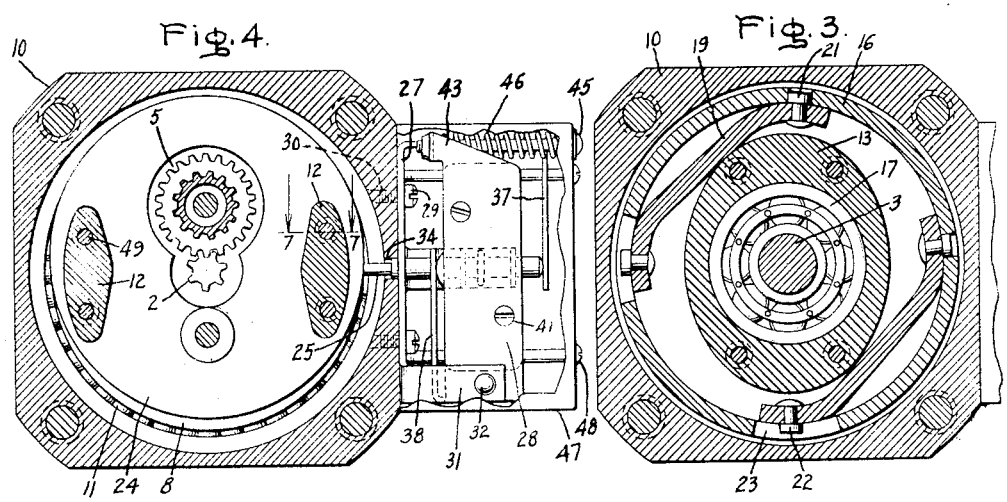
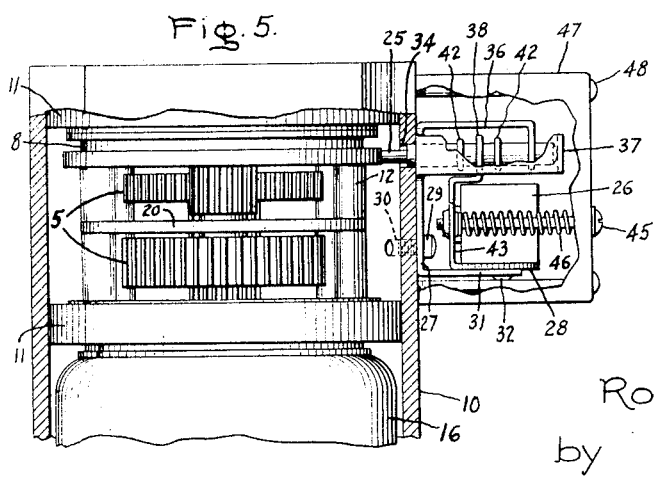
Inventor:
Robert P. Loveland
by Bravell S. Mack
His Attorney.

June 20, 1950 R. P. LOVELAND 2,512,349
POWER TRANSMISSION DEVICE
Filed Dec. 27, 1946 2 Sheets-Sheet 2

Inventor:
Robert P. Loveland,
by Crowell & Mack
His Attorney.

Patented June 20, 1950

2,512,349

UNITED STATES PATENT OFFICE 2,512,349

POWER TRANSMISSION DEVICE

Robert P. Loveland, Fort Wayne, Ind., assignor to General Electric Company, a corporation of New York Application December 27, 1946, Serial No. 718,801

3 Claims. (Cl. 74—751)

1

My invention relates to power transmission devices having means to absorb torque surges.

In power-transmitting, speed-changing apparatus, it is frequently desirable to provide a means to isolate excess torque applied to the output shaft from the driving shaft in order to prevent damage to the motor or gearing. It may also be desirable to provide a means responsive to a certain amount of excess torque to disconnect the source of power, reverse the direction of rotation to clear the obstruction, or otherwise modify the source of driving power. Various clutch arrangements have been used in this connection, but involve the difficulty of burned clutch faces, the necessity for a resetting mechanism and additional weight and size.

It is an object of my invention to provide in a power transmission system utilizing a gear train, a simple device to absorb excess torque without overstressing the gears or placing undue strain on the external structure of the driven mechanism.

Another object of my invention is to provide an improved torque-limiting device which will return to a normal condition on removal of the excess load and which will continue to function without interruption of motion.

A further object of my invention is to provide a device operating in an advantageous manner to remove or modify the action of the source of power of a gear transmission system on application of a predetermined torque in either direction of rotation.

A feature of this invention is the utilization of a single gear train to perform the functions of speed changing, absorption and limitation of torque surges, and the removal of the source of power on application of excess torque.

The features of novelty which characterize my invention will be pointed out with particularity in the claims annexed to and forming a part of this specification. Further objects and advantages of my invention will become apparent from and will be better understood by reference to the following description referring to the accompanying drawing.

In the drawings, Fig. 1 is a side elevational view in section of a device suitably embodying my invention; Fig. 2 is a sectional view taken along line 2—2 of Fig. 1; Fig. 3 is a sectional view

2 taken along line 2—2 of Fig. 1 illustrating the elements in a different stage of operation; Fig. 4 is a sectional view taken along line 4—4 of Fig. 1 showing a switch mechanism used with the device of Fig. 1; Fig. 5 is a plan view partially broken away; Fig. 6 is an exploded view of the switch mechanism of Figs. 4 and 5; and Fig. 7 is a sectional view taken along line 7—7 of Fig. 4 illustrating the construction of the switch actuating cam and pin of Figs. 4 and 5.

Referring to Figs. 1, 4 and 5, I have shown a driving pinion 2 formed integral with the driving shaft 1 which is connected to any suitable source of power (not shown). Driven shaft 3 which is connected to the load (also not shown) is attached to ring gear 4. Gear train 5 interconnects the driving pinion 2 and ring gear 4 through driven pinion 6 and serves normally to transmit power from the driving shaft 1 to the driven shaft 3. The gear elements of gear train 5 are supported by pins 7 which are mounted between the cradle end plate 8 and cradle 9. These two elements 8 and 9 are separated by spacers 12 to provide space for the gears of gear train 5, and dividing plate 20 separates the various gear elements of the gear train. Screws 49 connect cradle end plate 8, spacers 12 and dividing plate 20. Frame 10 surrounds gear train 5 and supports cradle end plate 8 and cradle 9 in suitable bearings 11. I have shown cradle 9 abutting ring gear 4 in a thrust bearing relationship thus providing support for the cradle and permitting it to rotate freely with respect to the ring gear.

It may now be seen that a restraining torque applied to driven shaft 3, holding ring gear 4 stationary, will cause driven pinion 6 to climb around the internal teeth of ring gear 4 when primary internal rotation is imparted to gear train 5 by driving shaft 1 and driving pinion 2. This movement of driven pinion 6 around ring gear 4 imparts a secondary orbital or planetary motion to gear train 5 which is transmitted to cradle end plate 8 and cradle 9 through pins 7. Thus, any restraint on driven shaft 3 will cause the cradle unit 8 and 9 to rotate relative to frame 10 on bearings 11. This rotation would continue as long as rotation of driven shaft 3 is opposed by any substantial force were it not for the restraining means now to be described.

In order to resist the free rotation of cradle unit 8 and 9, I have shown an elliptical cam 13 fastened to frame end plate 14 by bolts 15. Driven shaft 3 is carried by a suitable bearing 17 shown here mounted in cam 13. Connected to cradle 9 by pins 50 is a cylindrical member 16 within and concentric with frame 10 and rotatable with cradle unit 8 and 9. Cylindrical unit 16 is provided with bearings 18 for additional support. Referring now to Fig. 2 which shows the device in an unloaded condition, I have illustrated leaf springs 19 adapted to apply pressure at their midpoints on the flats of cam 13. Springs 19 are rigidly fastened at one end to cylindrical member 16 by rivets 21, the other ends being guided by rivets 22 engaging slots 23 in cylindrical member 16 to move tangentially when pressure is applied to the spring. This form of mounting of springs 19 serves the dual purpose of preventing lateral displacement of the springs (i. e. by the restraining action of the slots 23) and also, by varying the length of the slots 23 provides a limit to the tangential movement of the spring.

An inspection of Fig. 3 will indicate the manner in which the rotation of cradle unit 8 and 9 is restrained. As described above, a restraining torque applied to driven shaft 3 causes cylindrical member 16 to rotate relative to frame 10 and cam 13. The relative position of these parts after initial rotation of the cylindrical member 16 is shown in Fig. 3. This rotation of the cylindrical member causes springs 19 to ride around and 3 will indicate that when a torque surge is applying additional spring and frictional pressure on the surfaces of the cam. This resistive force between the springs 19 and cam 13, combined with a positive limit to the movement of the springs in slots 23 tends to resist the rotation of the cylindrical unit and, when the resistive force equals and overcomes the restraining torque on driven shaft 3, the driven pinion 6 will impart rotation to ring gear 4, picking up the load on the driven shaft. Once the starting torque has been overcome, it will be seen that the pressure of springs 19 on cam 13 tends to return the cylindrical member 16, cradle unit 8 and 9, and gear train 5 to the normal position shown in Fig. 2. As thus far described should the restraining torque on driven shaft 3 exceed the resistive force of the springs 19 on cam 13, the cylindrical member 16 will continue to rotate around the cam with no rotation being imparted to the driven shaft.

A review of the description of operation of items so far mentioned with respect to Figs. 1, 2, and 3 will indicate that when a torque surge is applied to the driven shaft 3, it will be absorbed by the rotation of springs 19 on the cam 13, and unless the restraining force is of unusual magnitude and substantial duration, the device will pick up load or otherwise transmit power without loss of motion.

The shape of cam 13 and the strength of springs 19 can be varied to produce different load responsive characteristics as desired. It will also be seen that the device as shown will operate in either direction of rotation.

In order to provide means to remove or otherwise modify the driving source of power when the torque applied to the driven shaft is of such magnitude and duration that the cylindrical member rotates without picking up the load, I have provided the limit switch arrangement shown in Figs. 4, 5 and 6. Referring now to Figs. 4 and 7, I have shown a cammed surface 24 formed integral with the cradle end plate 8 and in a 90 degree relative position to cam 13. In contact with cam 24, I have provided a switch-actuating pin 25 for operating switch 26. As described above, a restraining torque on driven shaft 3 causes concurrent rotation of the cradle units 8 and 9, thus rotating cam 24. By suitable adjustment of the form for the cam and switch mechanism now to be described, the switch 26 will be actuated when the springs 19 have rotated any predetermined amount. Switch 26 may be of any suitable character to simply deenergize the circuit of a driving motor, reverse the motor to clear the obstruction, or otherwise modify the source of driving power as desired. Fig. 7 illustrates in detail the relationship of cam 24 and actuating pin 25. It will now be seen that in the device including the limit switch arrangement, the cylindrical member 16 will not rotate completely around the cam 13 since at some predetermined amount of rotation, cam 24 will operate switch 26 to modify the source of driving power. It will also be seen that device is directionally sensitive, i. e. switch 26 can be actuated responsive to a predetermined rotation of cam 24 in either direction and then the driving source of power can be modified as desired for one direction of rotation and modified in a different manner for the opposite direction of rotation.

For adequate understanding of my switch mechanism which permits additional adjustment for actuating switch 26 for predetermined torque, reference should now be made to cross-sectional diagrams, Figs. 4 and 5, and to exploded perspective diagram, Fig. 6. It will be noted that the switch unit is composed of three major subassemblies, sub-base 27, switch support 28, and switch 26. The sub-base is fastened to frame 10 by means of screws 29 in holes 30. As can best be seen from Fig. 6, switch support 28, to which switch 26 is fastened by screws 41, is pivoted to arm 31 of sub-base 27 by rivet 32 in pivot holes 33. Switch-actuating pin 25 is supported by hole 34 in frame 10 and by hole 35 in extension 36 of sub-base 27. Another extension of the sub-base is spring arm 37, which is utilized to keep actuating pin 25 in constant contact with the surface of cam 24. Switch support 28 includes an adjusting arm 38, in which is provided a hole 39 for engaging actuating pin 25. The middle portion of adjusting arm 38 is positioned in contact with operating button 40 of switch 26. Fastened on the actuating pin 25 in suitable grooves are snap rings 42 which are utilized to operate adjusting arm 38, which in turn actuates switch 26. Switch support 28 has an extruded arm 43 containing tapped hole 44. Cover 47 surrounds the unit and is attached to frame 10 by screws 48. Adjusting screw 45, surrounded by spring 46, is inserted in a hole in cover 47 and threaded into tapped hole 44 in switch support arm 43. This adjusting screw is utilized to move the switch support 28 about pivot 32 to adjust the position of adjusting arm 38 between the snap rings 42.

In the operation of the switch assembly described above, cam 24, which engages actuating pin 25, is rotated by restraining force on driven shaft 3, thus either depressing the actuating pin or allowing it to move outward under pressure of spring arm 37. Movement of the actuating pin causes one of the snap rings 42 to engage in adjusting arm 38, which is moved either in or out by the appropriate snap ring, thus actuating switch 26. The adjusting arm has previously been positioned at the proper location between the snap rings to actuate the switch after the desired amount of rotation of the cam 24 by adjustment of adjusting screw 45. As can be seen, the spacing of the grooves holding the snap rings determines the span of cam 24, thus by providing actuating pins with different snap rings spacing, the amount of torque the device will handle before disconnecting or modifying the driving source may be controlled. It can be further seen that the provision of two snap rings in the spring arm 37 together with switch 26 with suitable contacts permits the driving source to be reversed or deenergized on application of overload to the device and further to be again reversed or reenergized on removal of the overload condition.

Summarizing the complete operation of my device, assuming power input to driving shaft 1, a restraining torque on driven shaft 3 is resolved in planetary motion of gear train 5, which is in turn transmitted into rotation of springs 19. These springs bear on fixed cam 13 and as they rotate apply additional resistive pressure opposing the rotation until this resistive force equals and overcomes the restraining torque on the driven shaft. In the event that the restraining torque is of such magnitude and duration that the resistive force of the springs does not overcome it, and to prevent damage to the driving source of power and gearing by such action, a further cam 24 is provided which rotates with the springs 19 and which actuates switch 26 to disconnect or modify the source of power after a predetermined amount of spring rotation. It will be seen that he inherent mass of the cradle assembly 8, 9, and 16 and the resilience of the springs 19 will dampen sudden surges of torque. Hence, the switch will not be actuated during momentary overload peaks if the predetermined rotation of the springs has not been reached. It is apparent that my invention provides these features in a compact unit of simple construction and operation.

While I have illustrated and described a particular embodiment of my invention, modifications thereof will occur to those skilled in the art. I desire it to be understood, therefore, that my invention is not limited to the particular arrangement of parts disclosed, and I intend in the appended claims to cover all modifications which do not depart from the spirit and scope of my invention.

What I claim as new and desire to secure by Letters Patent of the United States, is:

1. In a torque-limiting power transmission device, the combination of a driving member, a driven member, a speed changing gear train interconnecting said driving member and said driven member, a stationary frame member enclosing said gear train, a part of said gear train being adapted for planetary rotation with respect to said driven member when a restraining torque is applied to said driven member, a member rotatably supported within said frame member and adapted to surround and rotatably support said gear train, said rotatable member being adapted to rotate relative to said frame member responsive to said planetary motion of said gear train part, an elliptical cam mounted on said frame member, and a leaf spring mounted on said rotatable member and adapted to apply pressure at its midpoint on a flat of said cam when no torque is applied to said driven member, said rotatable member including a slot, said spring being fastened at one end to said rotatable member and the other end of said spring including means for slidingly engaging said slot to prevent unwanted displacement of said spring, said rotation of said rotatable member causing relative rotation of said spring with respect to said cam whereby said spring midpoint moves toward the high portion of said cam, said relative rotation of said spring applying additional pressure to said cam for increasingly resisting said rotation of said rotatable member, said spring being adapted to permit initial rotation of said rotatable member when a restraining torque is applied to said driven member and to restrain said rotation of said rotatable member when said pressure of said spring on said cam equals said restraining torque permitting driving torque to be imparted to said driven member whereby said device will pick up a driven load and absorb torque surges without loss of motion.

2. In a torque-limiting power transmission device, the combination of a driving member, a driven member, a speed changing gear train interconnecting said driving member and said driven member, a stationary frame member enclosing said gear train, a part of said gear train being adapted for planetary rotation with respect to said driven member when a restraining torque is applied to said driven member, a member rotatably supported within said frame member and adapted to surround and rotatably support said gear train, said rotatable member being adapted to rotate relative to said frame member responsive to said planetary motion of said gear train part, a cam mounted on said frame member, and resilient means mounted on said rotatable member normally applying pressure at a low point on said cam when no restraining torque is applied to said driven member and adapted to move toward the high portion of said cam responsive to rotation of said rotatable member to apply additional pressure thereto for increasingly resisting said rotation of said rotatable member whereby said resilient means permits initial rotation of said rotatable member when restraining torque is applied to said driven member and restrains said rotation when said pressure of said resilient means equals said restraining torque permitting driving torque to be transmitted to said driven member so that said device will pick up a driven load and absorb torque surges without loss of motion.

3. In a torque-limiting power transmission device, the combination of a driving member, a driven member, a speed changing gear train interconnecting said driving and said driven members, a stationary frame member enclosing said gear train, a part of said gear train being adapted for planetary rotation with respect to said driven member when a restraining torque is applied to said driven member, a rotatable cylindrical cradle member rotatably supported within said frame and surrounding a part of said gear train, said cradle member rotatably supporting said gear train and being adapted to rotate relative to said frame member responsive to said planetary motion of said gear train part, an elliptical cam mounted on said frame member, and a leaf spring mounted on said rotatable member normally applying pressure at its mid point on a flat of said cam when no restraining torque is applied to said driven member and adapted to move toward the high portion of said cam responsive to rotation of said rotatable member thus applying additional pressure to said cam for increasingly resisting said rotation of said rotatable member whereby said spring permits initial rotation of said rotatable member when a restraining torque is applied to said driven member and restrains said rotation when said spring pressure equals said restraining torque permitting driving torque to be transmitted to said driven member so that said device will pick up a driven load and absorb torque surges without lost motion.

ROBERT P. LOVELAND.

REFERENCES CITED

The following references are of record in the file of this patent:

UNITED STATES PATENTS

| Number | Name | Date |
| --- | --- | --- |
| 1,978,011 | Carter | Oct. 23, 1934 |
| 2,062,804 | Braga | Dec. 1, 1936 |
| 2,070,456 | Spinney | Feb. 9, 1937 |
| 2,143,710 | Murray | Jan. 10, 1939 |
| 2,152,517 | Whitney | Mar. 28, 1939 |
| 2,170,208 | Murray | Aug. 22, 1939 |
| 2,361,439 | Weiss | Oct. 31, 1944 |
| 2,403,094 | Lear | July 2, 1946 |

Certificate of Correction

Patent No. 2,512,349                                              June 20, 1950

ROBERT P. LOVELAND

It is hereby certified that error appears in the printed specification of the above numbered patent requiring correction as follows:

Column 3, line 34, strike out "and 3 will indicate that when a torque surge is" and insert instead the words and comma *cam 13 toward the high points of the cam,*; column 5, line 36, for "he" before "inherent" read *the*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*